March 18, 1924.
F. A. COUGHLIN
NOSE GUARD FOR DRAFT ANIMALS
Filed Feb. 28, 1923
1,487,147
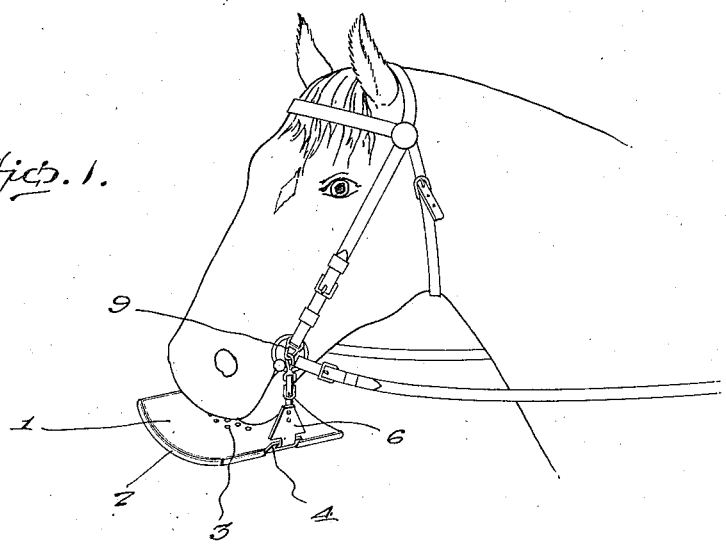
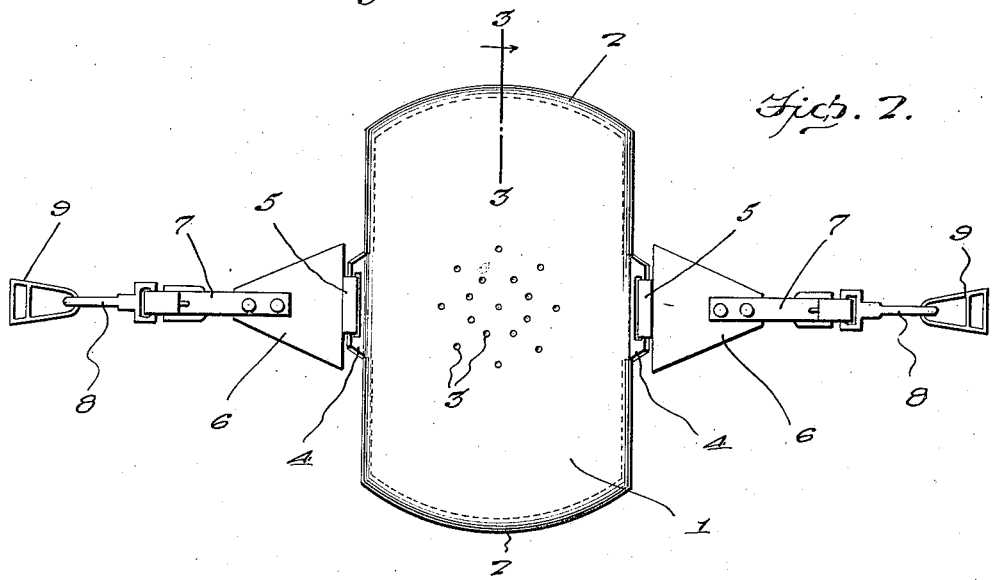
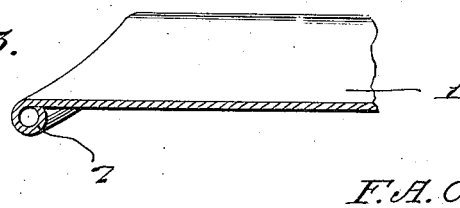

Patented Mar. 18, 1924.

1,487,147

UNITED STATES PATENT OFFICE.

FRANCIS A. COUGHLIN, OF BURNSTAD, NORTH DAKOTA.

NOSE GUARD FOR DRAFT ANIMALS.

Application filed February 28, 1923. Serial No. 621,902.

*To all whom it may concern:*

Be it known that I, FRANCIS A. COUGHLIN, a citizen of the United States, residing at Burnstad, in the county of Logan and State of North Dakota, have invented new and useful Improvements in Nose Guards for Draft Animals, of which the following is a specification.

My present invention has reference to harness attachments and aims to provide a nose guard which may be removably secured to the animal's bridle to protect said animal from the annoyance of flies or other insects.

A further object is to produce a device of this character which is swingably supported beneath the mouth and nostrils of a draft animal in a manner such as not to interfere with the convenience of the animal, and which serves as an efficient guard or protector to ward off insects which light on the lips and in the nostrils of the animal.

To the attainment of the foregoing, reference is to be had to the drawing which accompanies and which forms part of this application.

In the drawing:—

Figure 1 is a view illustrating the application of the improvement.

Figure 2 is a plan view of the improvement detached.

Figure 3 is a sectional view on the line 3—3 of Figure 2.

The body 1 of my improved guard is constructed from a single sheet of suitable metal rectangular in shape and is slightly rounded inwardly both longitudinally and transversely. The ends and the side edges of the guard 1 are rolled as at 2 not only to reinforce the plate from which the guard is formed but also to protect the animal from injury. The rolled ends are really in the nature of lips, being of a greater cross sectional diameter than the rolled side edges. The guard 1 is centrally provided with a series of apertures 3 which form air inlets to the mouth and nostrils of the animal.

The guard 1, at the center thereof has its side edges upturned and provided with extensions 4 centrally slotted to receive therethrough barrels 5 on one end of metal wings 6. The wings are substantially V-shaped in plan, and the barrel ends thereof hingedly associate the same with the body 1. The wings 6 have riveted or otherwise secured thereto straps 7 provided with buckles, and in the loops which are provided at the buckled ends of the straps there are received the eyes of snap hooks 8, which removably engage eyes 9 attached to the bit straps of the bridle.

My improvement is of an extremely simple construction which may be cheaply manufactured and marketed. The device does not interfere with the free breathing of the animal and may be readily detached from the bridle (by releasing the snaps 8 from the rings 9) during the animal's feeding time or when not desired for use. When removed from the bridle, the wings 6, together with the elements carried thereby may be folded over the body of the guard so that the device will occupy small space when not in use.

Having described the invention, I claim:—

A nose guard for draft animals comprising a body rectangular in shape and slightly rounded inwardly both longitudinally and transversely, said body being provided with rolled edges, oppositely disposed upturned slotted extensions on the side edges of the body, triangular shaped wings having barrels received in said slots to secure the wings in hinged relation to the body and attaching straps connected to said wings opposite said barrels.

In testimony whereof I affix my signature.

FRANCIS A. COUGHLIN.